United States Patent
Yeh et al.

(10) Patent No.: US 12,523,820 B2
(45) Date of Patent: Jan. 13, 2026

(54) OPTICAL SWITCH MODULE AND OPTICAL BY-PASS APPARATUS

(71) Applicant: Formerica Optoelectronics, Inc., Hsinchu County (TW)

(72) Inventors: Hung-Fu Yeh, Hsinchu County (TW); Ching-Jen Wen, Hsinchu County (TW); Ping-Fang Tsai, Hsinchu County (TW)

(73) Assignee: Formerica Optoelectronics, Inc., Hsinchu County (TW)

( * ) Notice: Subject to any disclaimer, the term of this patent is extended or adjusted under 35 U.S.C. 154(b) by 330 days.

(21) Appl. No.: 18/493,086

(22) Filed: Oct. 24, 2023

(65) Prior Publication Data

US 2024/0134246 A1   Apr. 25, 2024
US 2024/0231179 A9   Jul. 11, 2024

Related U.S. Application Data

(60) Provisional application No. 63/419,030, filed on Oct. 25, 2022.

(51) Int. Cl.
*G02B 6/35* (2006.01)

(52) U.S. Cl.
CPC ......... *G02B 6/3528* (2013.01); *G02B 6/3524* (2013.01); *G02B 6/351* (2013.01)

(58) Field of Classification Search
CPC ..... G02B 6/351; G02B 6/3524; G02B 6/3528
See application file for complete search history.

(56) References Cited

U.S. PATENT DOCUMENTS

| | | | |
|---|---|---|---|
| 2003/0048978 A1* | 3/2003 | Chen | G02B 6/3524 385/21 |
| 2006/0198574 A1* | 9/2006 | Cai | G02B 6/3528 385/16 |

FOREIGN PATENT DOCUMENTS

| | | | |
|---|---|---|---|
| CN | 200989963 Y | * | 12/2007 |
| CN | 103048738 A | * | 4/2013 |
| CN | 204269864 U | * | 4/2015 |
| CN | 104793294 A | * | 7/2015 |
| CN | 212460102 U | * | 2/2021 |

* cited by examiner

*Primary Examiner* — Michael Stahl

(57) ABSTRACT

An optical switch module includes a housing, at least two first collimators, at least two second collimators, a relay, and plural prisms. The housing has an accommodating space, a first sidewall, and a second sidewall. The first collimators are located on the first sidewall. Each of the first collimators connects even number of first fibers. The second collimators are located on the second sidewall. Each of the second collimators connects even number of second fibers. The second collimators are respectively aligned with the first collimators. The relay is located in the accommodating space and has a rotation support. The prisms are located on the rotation support and respectively between the first and second collimators. The rotation support is configured to enable at least one of the prisms to be in light transmission paths between the first fibers and the second fibers.

20 Claims, 16 Drawing Sheets

OPTICAL SWITCH MODULE AND OPTICAL BY-PASS APPARATUS

CROSS-REFERENCE TO RELATED APPLICATIONS

This application claims priority to U.S. Provisional Application Ser. No. 63/419,030, filed Oct. 25, 2022 which is herein incorporated by reference.

BACKGROUND

Field of Invention

The present disclosure relates to an optical switch module and a by-pass apparatus having the optical switch module.

Description of Related Art

In general, an optical switch module uses the position of a prism to control whether the optical signal of the collimator is refracted or not. For example, when a fiber route is in normal mode (Fiber route normal mode), a prism is not in the optical path of the collimator, and thus the optical signal can be transmitted straight to another collimator on the opposite side, which is a pass-through optical path. When the optical route is in by-pass mode (Fiber route by-pass mode), the prism is located in the optical path of the collimator, and thus the optical signal is refracted and transmitted to another collimator on the opposite side by the prism.

However, products often require a certain number of optical switch modules, and the number of housings of conventional optical switch modules increases with the increase of the number of optical switch modules, which easily occupies too much space, and the materials (such as the housing structures) cost are difficult to reduce.

SUMMARY

According to some embodiments of the present disclosure, an optical switch module includes a housing, at least two first collimators, at least two second collimators, a relay, and plural prisms. The housing has an accommodating space, a first sidewall, and a second sidewall that is opposite to the first sidewall. The accommodating space is located between the first sidewall and the second sidewall. The first collimators are located on the first sidewall. Each of the first collimators is configured to connect even number of first fibers. The second collimators are located on the second sidewall. Each of the second collimators is configured to connect even number of second fibers. The second collimators are respectively aligned with the first collimators. The relay is located in the accommodating space and has a rotation support. Each of two ends of the rotation support extends to a position between the aligned first and second collimators. The prisms are located on the rotation support and respectively between the first and second collimators. The rotation support is configured to enable at least one of the prisms to be in light transmission paths between a partial number of the first fibers and a partial number of the second fibers to refract optical signals of the partial number of the first fibers to another partial number of the second fibers.

According to some embodiments of the present disclosure, an optical switch module includes a housing, at least two first collimators, at least two second collimators, a relay, and a plurality of prisms. The housing has an accommodating space, a first sidewall, and a second sidewall, wherein the accommodating space is located between the first sidewall and the second sidewall. The first collimators are located on the first sidewall, wherein each of the first collimators is configured to connect even number of first fibers. The second collimators are located on the second sidewall, wherein each of the second collimators is configured to connect even number of second fibers, and the second collimators are respectively aligned with the first collimators. The relay located is in the accommodating space and has a rotation support, wherein a fulcrum of the rotation support is located on a center line of the rotation support to define a seesaw structure. The prisms are located on the rotation support, wherein a first partial number of the prisms and a second partial number of the prisms are respectively located at two sides of the center line of the rotation support, and the rotation support is configured to enable at least one of the prisms to be in light transmission paths between a partial number of the first fibers and a partial number of the second fibers to refract optical signals of the partial number of the first fibers to another partial number of the second fibers.

According to some embodiments of the present disclosure, an optical by-pass apparatus includes a first optical transceiver, a second optical transceiver, a first multi-fiber connector, a second multi-fiber connector, and an optical switch module. The first multi-fiber connector is optically connected to the first optical transceiver, and the second multi-fiber connector is optically connected to the second optical transceiver. The optical switch module includes a housing, at least two first collimators, at least two second collimators, a relay, and a plurality of prisms. The housing has an accommodating space, a first sidewall, and a second sidewall that is opposite to the first sidewall, wherein the accommodating space is located between the first sidewall and the second sidewall. The first collimators are located on the first sidewall, wherein each of the first collimators is configured to connect even number of first fibers. The second collimators are located on the second sidewall, wherein each of the second collimators is configured to connect even number of second fibers, and the second collimators are respectively aligned with the first collimators. The first optical transceiver connects the first fibers of a first partial number of the first collimators, and the first multi-fiber connector connects the first fibers of a second partial number of the first collimators. The second optical transceiver connects the second fibers of a first partial number of the second collimators, and the second multi-fiber connector connects the second fibers of a second partial number of the second collimators. The relay is located in the accommodating space and has a rotation support, wherein each of two ends of the rotation support extends to a position between the aligned first and second collimators. The prisms are located on the rotation support and respectively between the first and second collimators, wherein the rotation support is configured to enable at least one of the prisms to be in light transmission paths between a partial number of the first fibers and a partial number of the second fibers to refract optical signals of the partial number of the first fibers to another partial number of the second fibers.

In the aforementioned embodiments of the present disclosure, since the first collimators are located on the first sidewall of the housing and the second collimators are located on the second sidewall of the housing, the second collimators can be respectively aligned with the first collimators. Moreover, the relay is located in the accommodating space of the housing and the prisms are located on the rotation support of the relay, and thus the rotation support can raise and lower the prisms by rotating, such that the prisms may be selectively located in the light transmission paths between the first fibers of the first collimators and the second fibers of the second collimators. When a prism is not located in light transmission paths between the aligned first and second fibers, the optical signals of the first fibers can be pass-through optical paths with the second fibers, and the fiber route is in normal mode (Fiber route normal mode). When a prism is located in light transmission paths between a partial number of the first fibers and a partial number of the second fibers, the prism can refract the optical signals of the partial number of the first fibers to another partial number of the second fibers, and the fiber route is in by-pass mode (Fiber route by-pass mode). Through the aforementioned configuration, the optical switch module can achieve the function of an all-in-one conventional optical switch module using a single housing, which can avoid the number of housings from increasing as the number of optical switch modules increases, thereby effectively saving space and reducing quantity and cost of materials (such as housings and relays).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
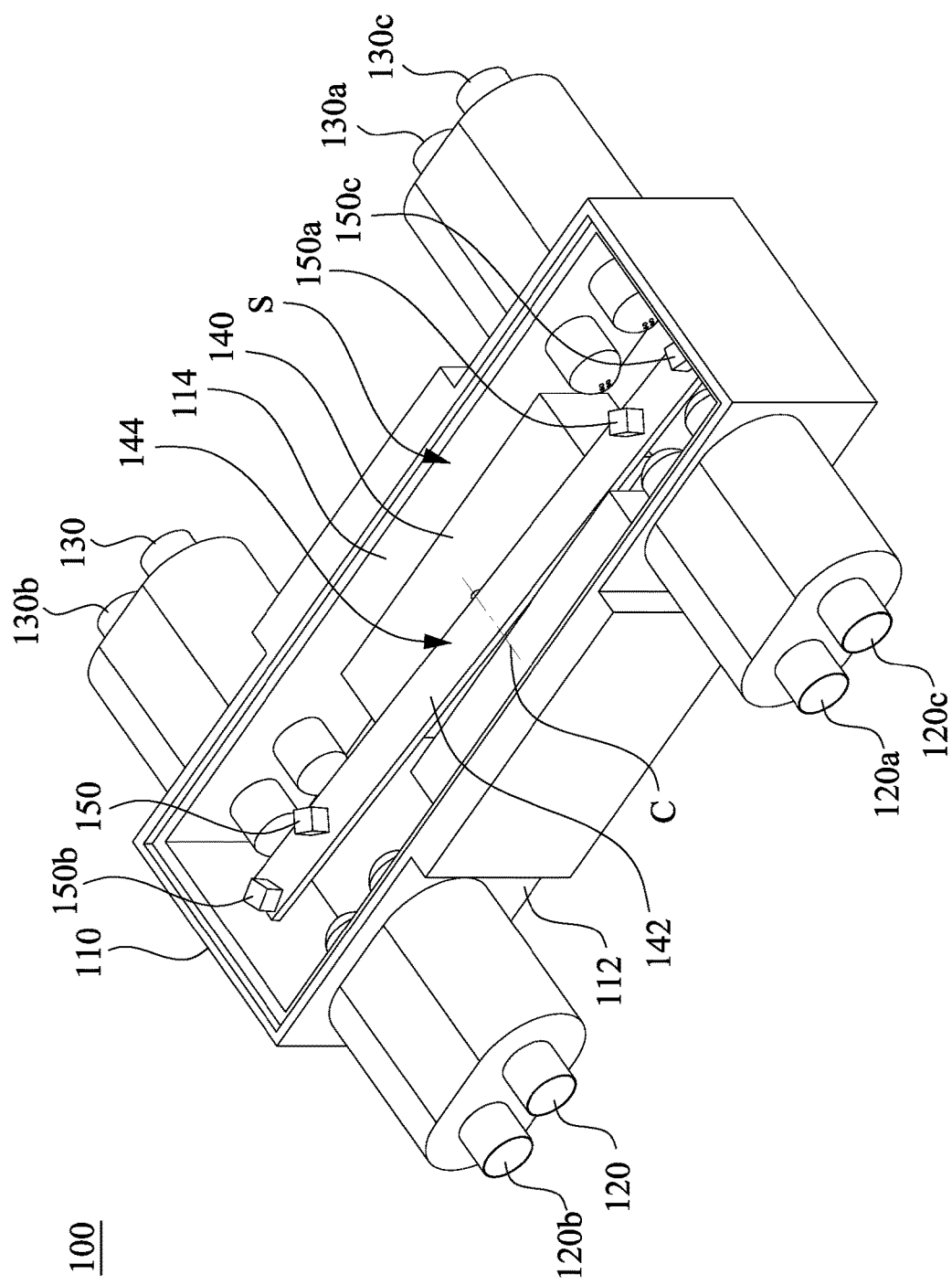
FIG. 1 is a perspective view of an optical switch module according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
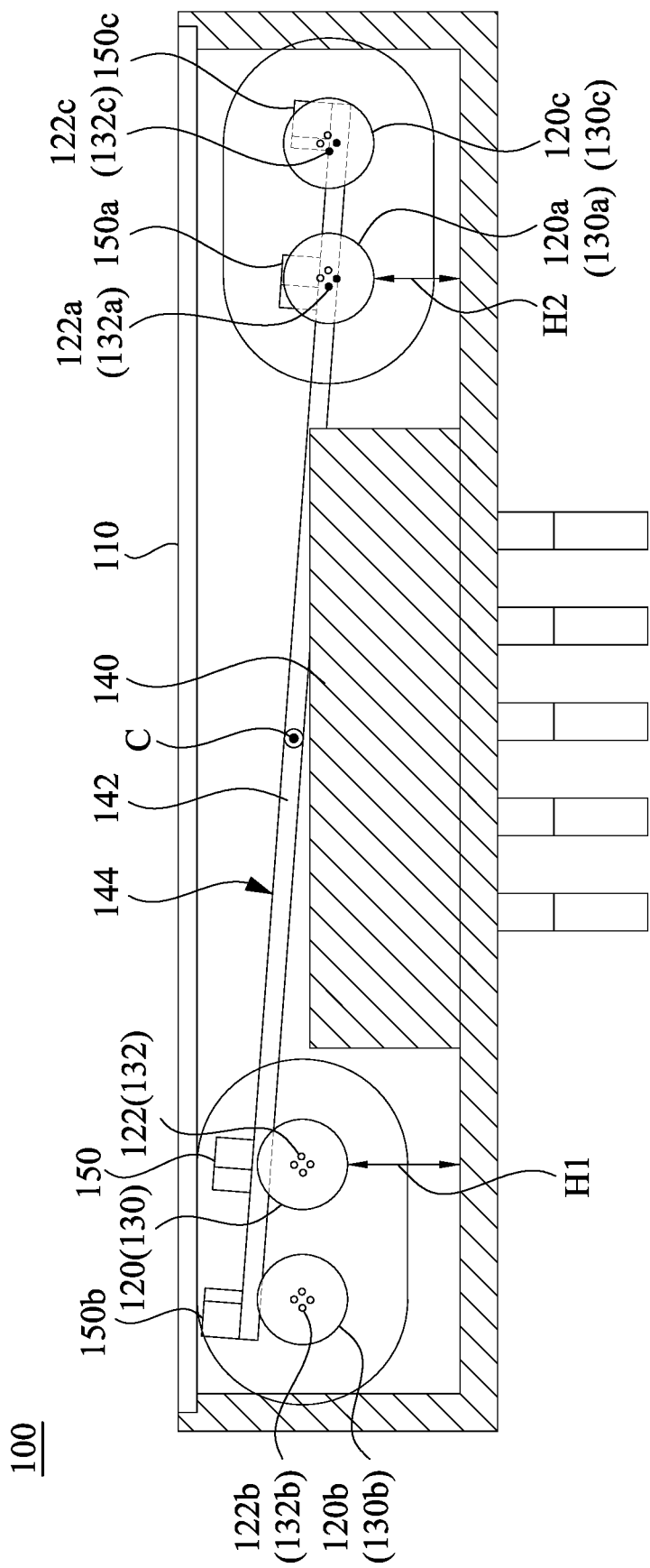
FIG. 2 is a schematic side view of the optical switch module of FIG. 1.

FIG. 1 is a perspective view of an optical switch module 100 according to one embodiment of the present disclosure. FIG. 2 is a schematic side view of the optical switch module 100 of FIG. 1. As shown in FIG. 1 and FIG. 2, the optical switch module 100 includes a housing 110, first collimators 120, 120*a*, 120*b* and 120*c*, second collimators 130, 130*a*, 130*b* and 130*c*, a relay 140, and prisms 150, 150*a*, 150*b* and 150*c*. The number of the first collimators and the number of the second collimators are the same, such as four, but not limited to four. The housing 110 has an accommodating space S, a first sidewall 112, and a second sidewall 114 that is opposite to the first sidewall 112. The accommodating space S is located between the first sidewall 112 and the second sidewall 114. The first collimators 120, 120*a*, 120*b* and 120*c* are located on the first sidewall 112 of the housing 110. The first collimator 120 connects even number of first fibers 122, the first collimator 120*a* connects even number of first fibers 122*a*, the first collimator 120*b* connects even number of first fibers 122*b*, and the first collimator 120*c* connects even number of first fibers 122*c*.

Furthermore, the second collimators 130, 130*a*, 130*b* and 130*c* are located on the second sidewall 114 of the housing 110. The second collimators 130, 130*a*, 130*b* and 130*c* are respectively aligned with the first collimators 120, 120*a*, 120*b* and 120*c*, that is, the first and second collimators are disposed opposite to each other. The second collimator 130 connects even number of second fibers 132, the second collimator 130*a* connects even number of second fibers 132*a*, the second collimator 130*b* connects even number of second fibers 132*b*, and the second collimator 130*c* connects even number of second fibers 132*c*. In FIG. 2, it is to be noted that because the positions of the second collimators 130, 130*a*, 130*b* and 130*c* respectively correspond to the positions of the first collimators 120, 120*a*, 120*b* and 120*c* (i.e., the first and second collimators aligned with each other), only four collimators are shown; and that the positions of the second fibers 132, 132*a*, 132*b* and 132*c* respectively correspond to the positions of the first fibers 122, 122a, 122b and 122c, and thus only four fibers are shown in each of the collimators.

The relay 140 is located in the accommodating space S and has a rotation support 142. One end of the rotation support 142 extends to a position between the aligned first and second collimators 120b and 130b, and another end of the rotation support 142 extends to a position between the aligned first and second collimators 120c and 130c. The rotation support 142 may be the armature of the relay 140, but the present disclosure is not limited in this regard. The fulcrum of the rotation support 142 is located on a center line C of the rotation support 142 to define a seesaw structure. In this embodiment, the first collimators 120 and 120b and the second collimators 130 and 130b are located at one side of the center line C of the rotation support 142 (e.g., at the left side of FIG. 1), and the first collimators 120a and 120c and the second collimators 130a and 130c are located at another side of the center line C of the rotation support 142 (e.g., at the right side of FIG. 1).

Moreover, the two first collimators 120 and 120b and the two second collimators 130 and 130b located at the left side of the center line C of the rotation support 142 have the same height in a vertical direction so as to have a first height H1, but another two first collimators 120a and 120c and another two second collimators 130a and 130c located at another side of the center line C of the rotation support 142 have the same height in the vertical direction so as to have a second height H2, and the second height H2 is less than the first height H1. It should be noted that the first height H1 and the second height H2 can be adjusted by calculating based on optical refraction and the height of the rotation support 142, which can be designed according to actual needs, and are not limited to this embodiment.

The prisms 150, 150a, 150b and 150c are located on the rotation support 142, the prism 150 is located between the first collimator 120 and the second collimator 130, the prism 150a is located between the first collimator 120a and the second collimator 130a, the prism 150b is located between the first collimator 120b and the second collimator 130b, the prism 150c is located between the first collimator 120c and the second collimator 130c. In this embodiment, the first partial number of the prisms 150 and 150b and the second partial number of the prisms 150a and 150c are located on a top surface 144 of the rotation support 142. In addition, the prisms 150, 150a, 150b and 150c may be arranged along the lengthwise direction of the rotation support 142 of the relay 140. The first partial number of the prisms 150 and 150b and the second partial number of the prisms 150a and 150c may be respectively located at the two sides of the center line C of the rotation support 142. For example, the prisms 150 and 150b are located at the left side of the center line C of FIG. 1, and the prisms 150a and 150c are located at the right side of the center line C of FIG.

In some embodiments, the optical switch module 100 may be applied to a server. The optical switch module 100 can switch from a pass-through fiber route to a by-pass fiber route when an optical signal is abnormal, thereby preventing the interruption of signal transmission. In the following description, the status of the optical switch module 100 during operation will be explained.

Figure 3:
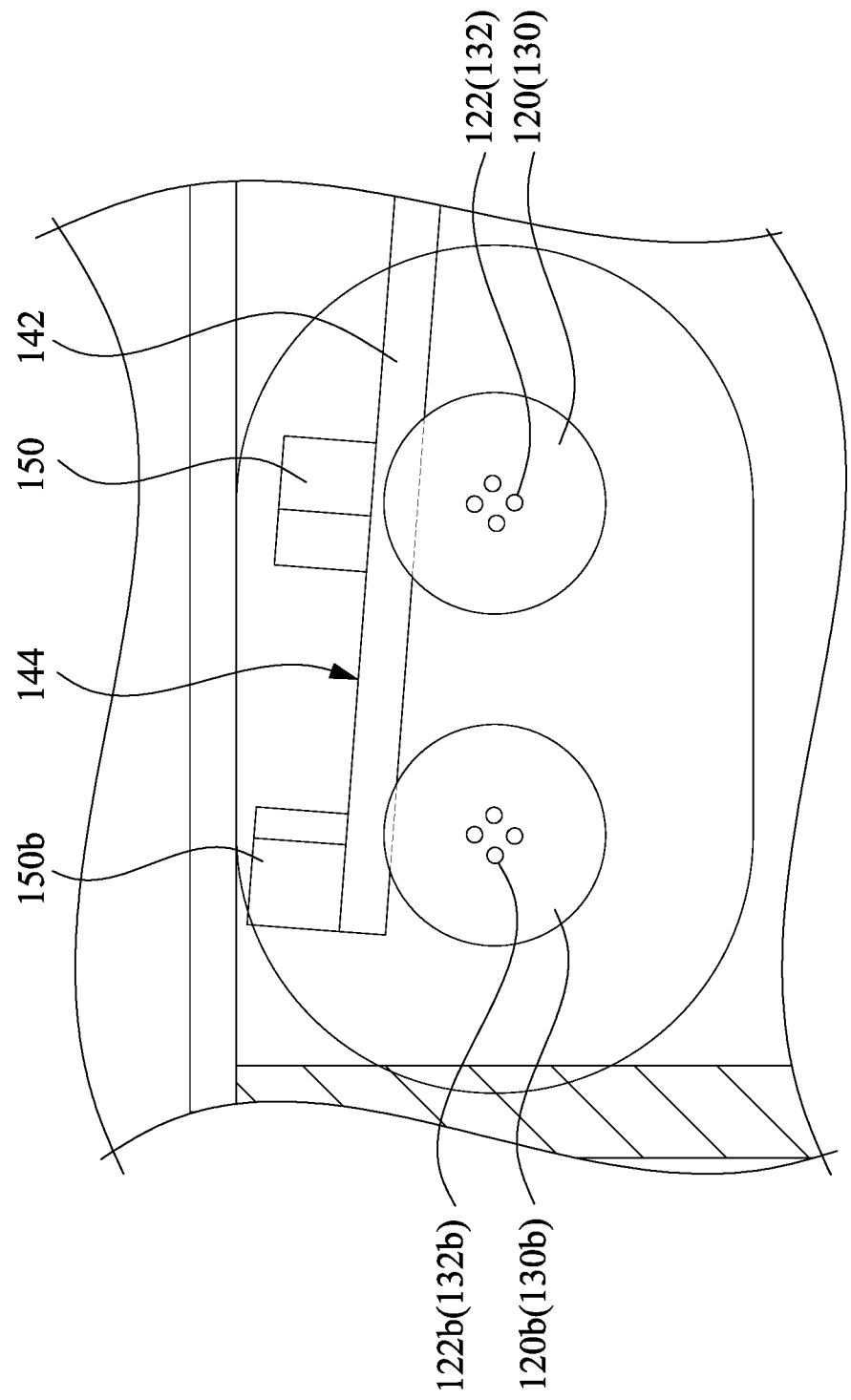
FIG. 3 is a partially enlarged view of first collimators at the left side of FIG. 2, in which the fiber route of FIG. 3 is in normal mode.

FIG. 3 is a partially enlarged view of the first collimators 120 and 120b at the left side of FIG. 2, in which the fiber route of FIG. 3 is in normal mode (Fiber route normal mode). As shown in FIG. 2 and FIG. 3, the rotation support 142 is in a state of high left and low right. Regarding the state of the first collimator 120 and the opposite second collimator 130 in FIG. 3, the rotation support 142 is configured to enable the prism 150 to leave light transmission paths between the first fibers 122 and the second fibers 132, such that the optical signals of the first fibers 122 can pass directly to the opposite second fibers 132. The operation mechanism of the first collimator 120b and the second collimator 130b are similar to that of the aforementioned first collimator 120 and the second collimator 130, and will not be described again.

Figure 4:
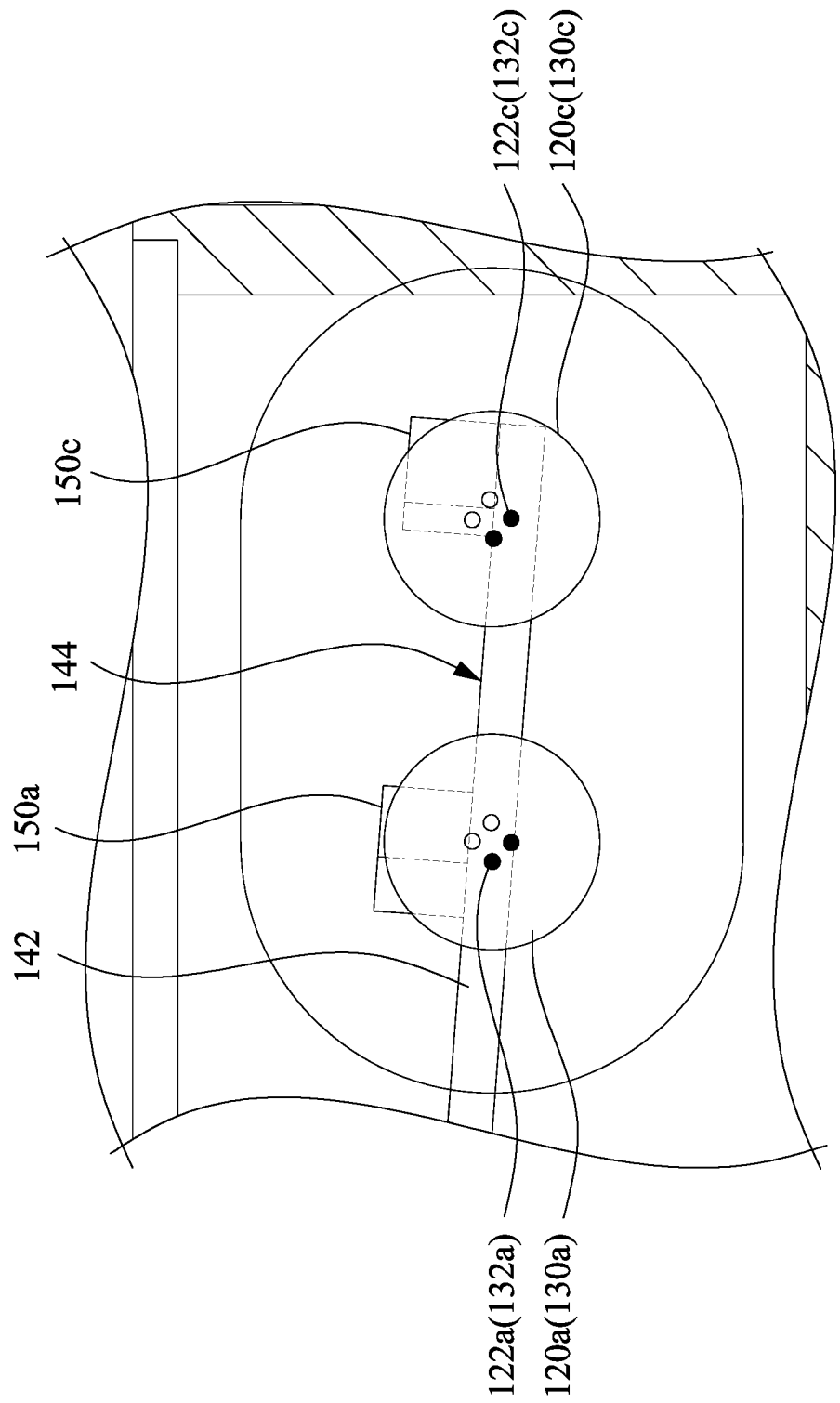
FIG. 4 is a partially enlarged view of the first collimators at the right side of FIG. 2, in which the fiber route of FIG. 4 is in by-pass mode.

FIG. 4 is a partially enlarged view of the first collimators 120a and 120c at the right side of FIG. 2, in which the fiber route of FIG. 4 is in by-pass mode. As shown in FIG. 2 and FIG. 4, the rotation support 142 is in the state of high left and low right. Regarding the state of the first collimator 120a and the opposite second collimator 130a in FIG. 4, the rotation support 142 is configured to enable the prism 150a to be in light transmission paths between a partial number of the first fibers 122a (e.g., the two first fibers 122a at the lower left side of FIG. 4) and a partial number of the opposite second fibers 132a (e.g., the two second fibers 132a at the lower left side of FIG. 4), such that the prism 150a refracts the optical signals of the partial number of the first fibers 122a to another partial number of the second fibers 132a (e.g., the two second fibers 132a at the upper right side of FIG. 4) to form a by-pass route. The operation mechanism of the first collimator 120c and the second collimator 130c are similar to that of the aforementioned first collimator 120a and the second collimator 130a, and will not be described again.

As shown in FIG. 1, specifically, since the first collimators 120, 120a, 120b and 120c are located on the first sidewall 112 of the housing 110 and the second collimators 130, 130a, 130b and 130c are located on the second sidewall 114 of the housing 110, the second collimators 130, 130a, 130b and 130c can be respectively aligned with the first collimators 120, 120a, 120b and 120c. Moreover, the relay 140 is located in the accommodating space S of the housing 110, and the prisms 150, 150a, 150b and 150c are located on the rotation support 142 of the relay 140, and thus the rotation support 142 can raise and lower the prisms 150, 150a, 150b and 150c by rotating, such that the prisms 150, 150a, 150b and 150c may be selectively located in the light transmission paths between the first fibers 122, 122a, 122b and 122c (see FIG. 2) of the first collimators 120, 120a, 120b and 120c and the corresponding second fibers 132, 132a, 132b and 132c (see FIG. 2) of the second collimators 130, 130a, 130b and 130c. When the prism 150 is not located in light transmission paths between the aligned first and second fibers 122 and 132 (as shown in FIG. 3), the optical signals of the first fibers 122 can be pass-through optical paths with the second fibers 132, and the fiber route is in normal mode (Fiber route normal mode). When the prism 150a is located in light transmission paths between a partial number of the first fibers 122a and a partial number of the second fibers 132a (as shown in FIG. 4), the prism 150a can refract the optical signals of the partial number of the first fibers 122a to another partial number of the second fibers 132a, and the fiber route is in by-pass mode (Fiber route by-pass mode). Through the aforementioned configuration, the optical switch module 100 can achieve the function of an all-in-one conventional optical switch module using a single housing 110, which can avoid the number of housings from increasing as the number of optical switch modules increases, thereby effectively saving space and reducing quantity and cost of materials (such as housings and relays).

Figure 5:
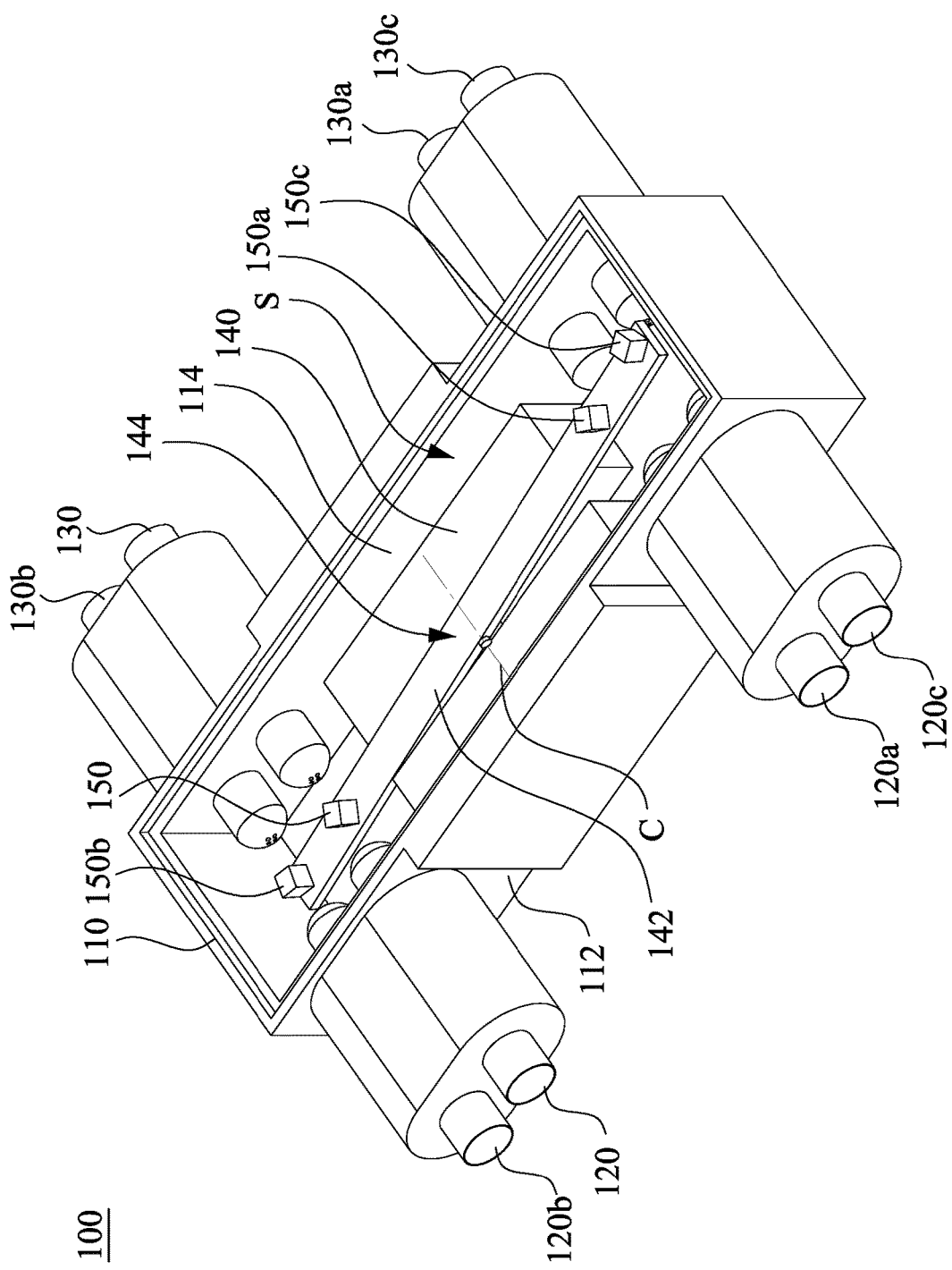
FIG. 5 is a perspective view of a rotation support of a relay of FIG. 1 after rotating.
Figure 6:
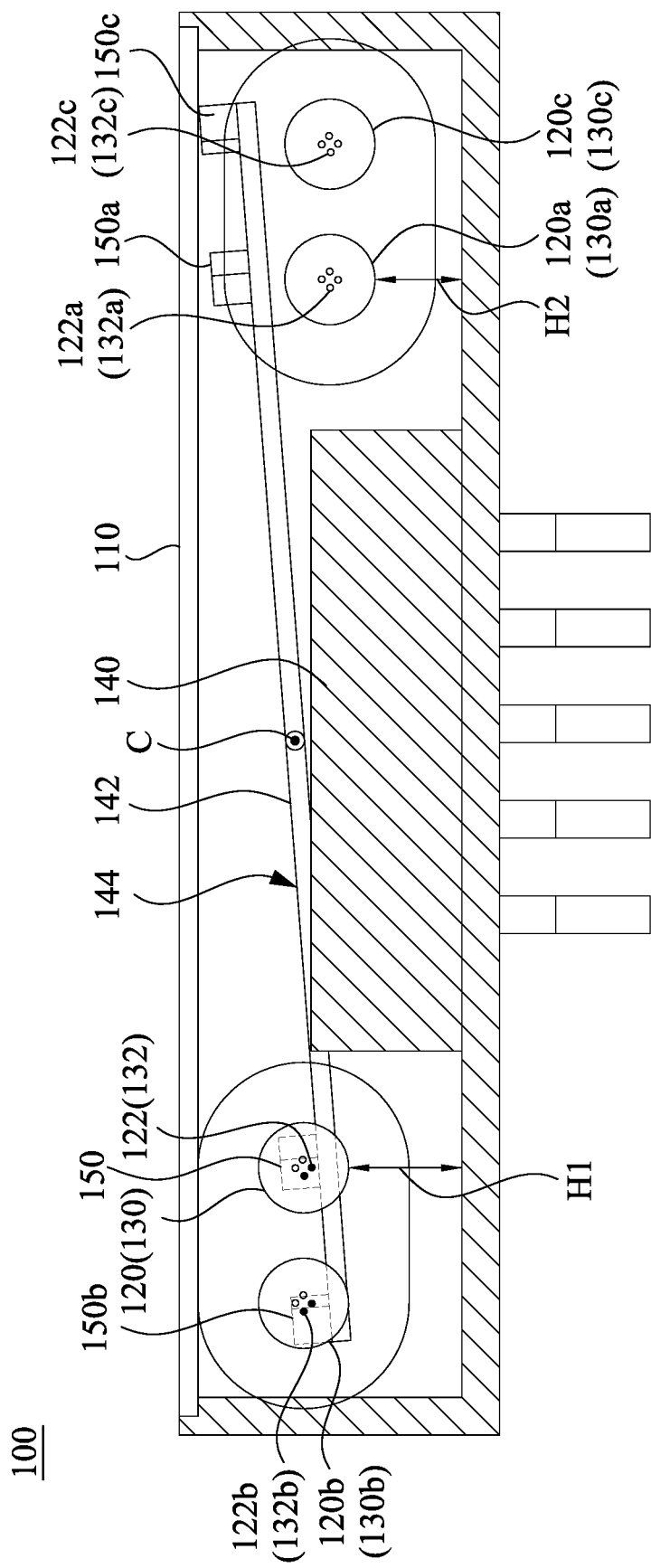
FIG. 6 is a schematic side view of the optical switch module of FIG. 5.

FIG. 5 is a perspective view of the rotation support 142 of the relay 140 of FIG. 1 after rotating. FIG. 6 is a schematic side view of the optical switch module 100 of FIG. 5. As shown in FIG. 5 and FIG. 6, the rotation support 142 rotates from the state of high left and low right in FIG. 1 to the state of low left and high right in FIG. 5. As a result, the prisms 150 and 150b are lowered along with the left end of the rotation support 142, and the prisms 150a and 150c are raised along with the right end of the rotation support 142.

Figure 7:
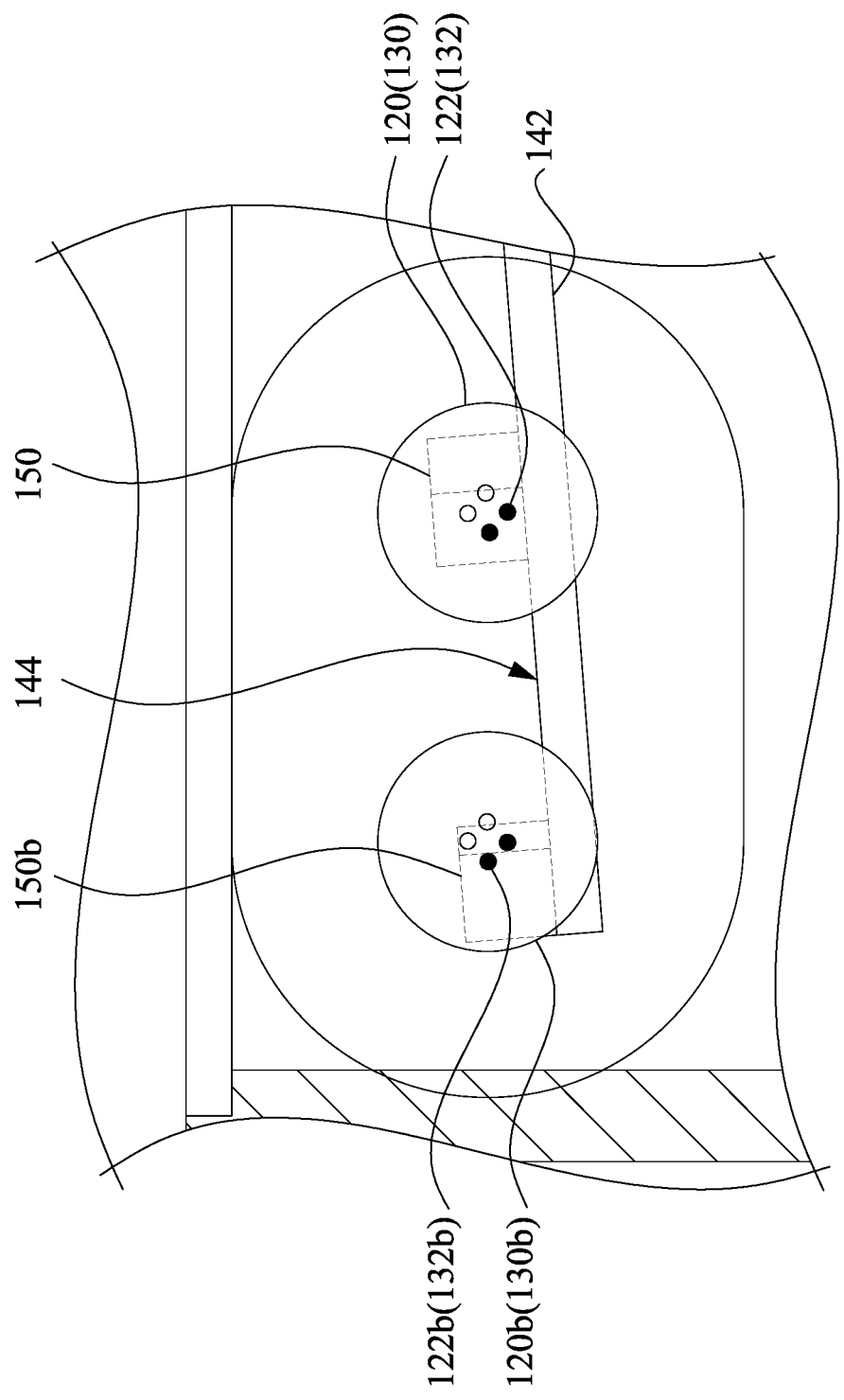
FIG. 7 is a partially enlarged view of the first collimators at the left side of FIG. 6, in which the fiber route of FIG. 7 is in by-pass mode.

FIG. 7 is a partially enlarged view of the first collimators 120 and 120b at the left side of FIG. 6, in which the fiber route of FIG. 7 is in by-pass mode. As shown in FIG. 6 and FIG. 7, regarding the state of the first collimator 120 and the opposite second collimator 130 in FIG. 7, the rotation support 142 is configured to enable the prism 150 to be in light transmission paths between a partial number of the first fibers 122 (e.g., the two first fibers 122 at the lower left side of FIG. 7) and a partial number of the opposite second fibers 132 (e.g., the two second fibers 132 at the lower left side of FIG. 7), such that the prism 150 refracts the optical signals of the partial number of the first fibers 122 to another partial number of the second fibers 132 to form a by-pass route. The operation mechanism of the first collimator 120b and the second collimator 130b are similar to that of the aforementioned first collimator 120 and the second collimator 130, and will not be described again.

Figure 8:
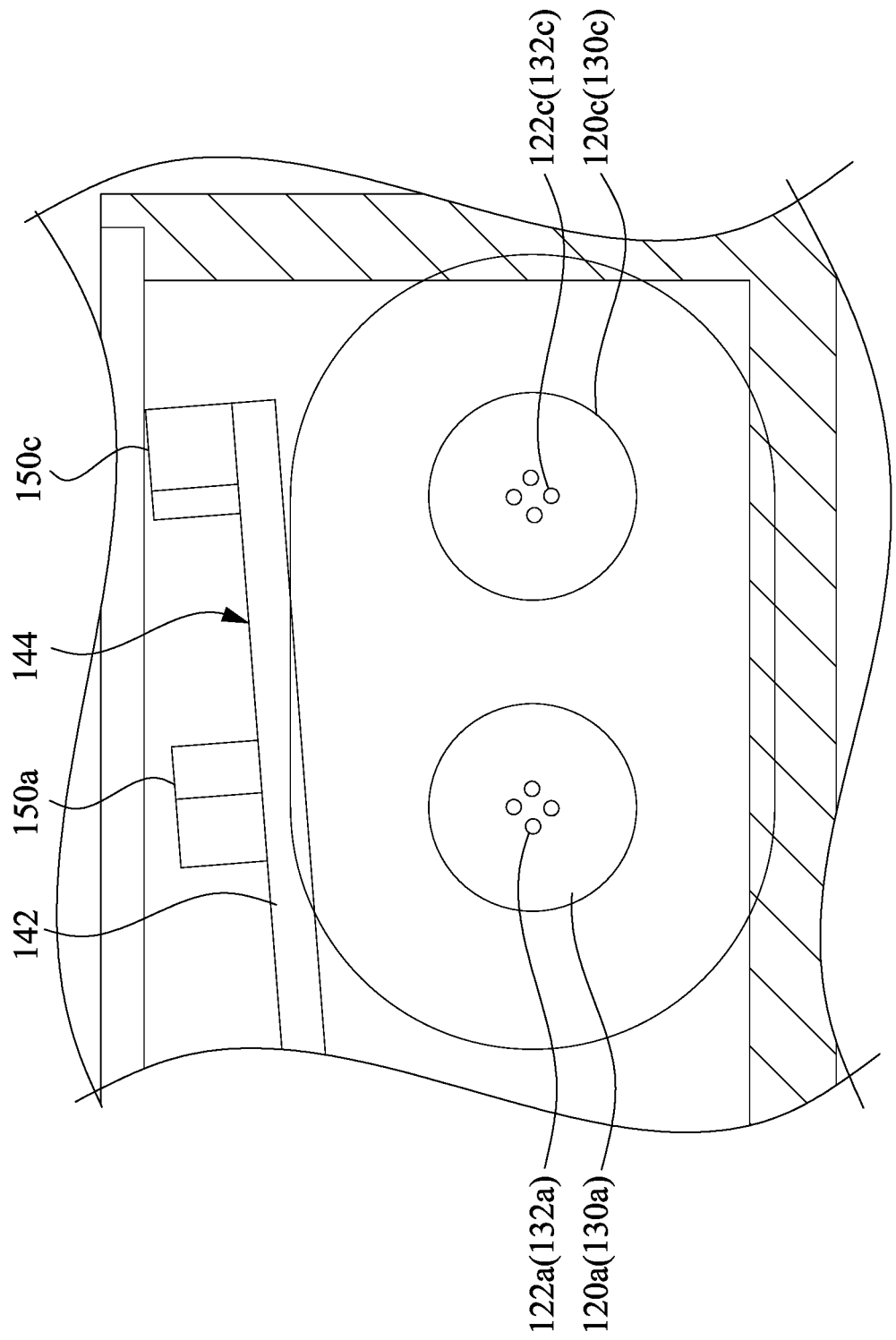
FIG. 8 is a partially enlarged view of the first collimators at the right side of FIG. 6, in which the fiber route of FIG. 8 is in normal mode.

FIG. 8 is a partially enlarged view of the first collimators 120a and 120c at the right side of FIG. 6, in which the fiber route of FIG. 8 is in normal mode. As shown in FIG. 6 and FIG. 8, regarding the state of the first collimator 120a and the opposite second collimator 130a in FIG. 8, the rotation support 142 is configured to enable the prism 150a to leave light transmission paths between the first fibers 122a and the opposite second fibers 132a, such that the optical signals of the first fibers 122a can pass directly to the opposite second fibers 132a. The operation mechanism of the first collimator 120c and the second collimator 130c are similar to that of the aforementioned first collimator 120a and the second collimator 130a, and will not be described again.

It is to be noted that the connection relationships, the materials, and the advantages of the elements described above will not be repeated in the following description. In the following description, other types of optical switch modules will be explained.

Figure 9:
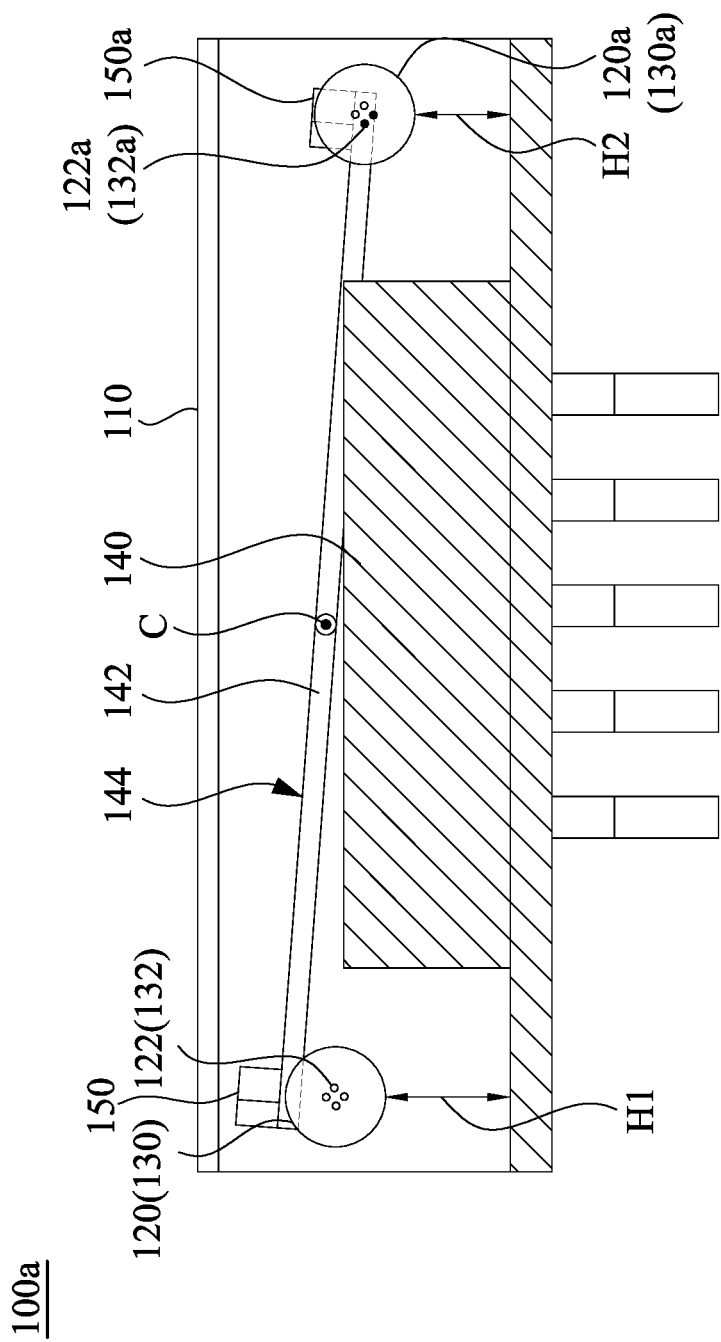
FIG. 9 is a schematic side view of an optical switch module according to another embodiment of the present disclosure.

FIG. 9 is a schematic side view of an optical switch module 100a
according to another embodiment of the present disclosure. The optical switch module 100a includes the housing 110, the first collimators 120 and 120a, the second collimators 130 and 130a, the relay 140, and the prisms 150 and 150a. The difference between this embodiment and the embodiment of FIG. 2 is that the number of the first collimators, the number of the prisms, and the number of the second collimators are two. The first collimators 120 and 120a are respectively located at two sides of the center line C of the rotation support 142, and the second collimators 130 and 130a are respectively located at the two sides of the center line C of the rotation support 142. There is a height different between the first collimators 120 and 120a in a vertical direction (i.e., the difference between the first height H1 and the second height H2), and there is a height different between the second collimators 130 and 130a in the vertical direction (i.e., the difference between the first height H1 and the second height H2).

In FIG. 9, the rotation support 142 is in a state of high left and low right. Regarding the state of the first collimator 120 and the opposite second collimator 130 in FIG. 9, the rotation support 142 is configured to enable the prism 150 to leave light transmission paths between the first fibers 122 and the opposite second fibers 132, such that the optical signals of the first fibers 122 can pass directly to the opposite second fibers 132. Regarding the state of the first collimator 120a and the opposite second collimator 130a in FIG. 9, the rotation support 142 is configured to enable the prism 150a to be in light transmission paths between a partial number of the first fibers 122a (e.g., the two first fibers 122a at the lower left side of FIG. 9) and a partial number of the opposite second fibers 132a (e.g., the two second fibers 132a at the lower left side of FIG. 9), such that the prism 150a refracts the optical signals of the partial number of the first fibers 122a to another partial number of the second fibers 132a (e.g., the two second fibers 132a at the upper right side of FIG. 9) to form a by-pass route.

Figure 10:
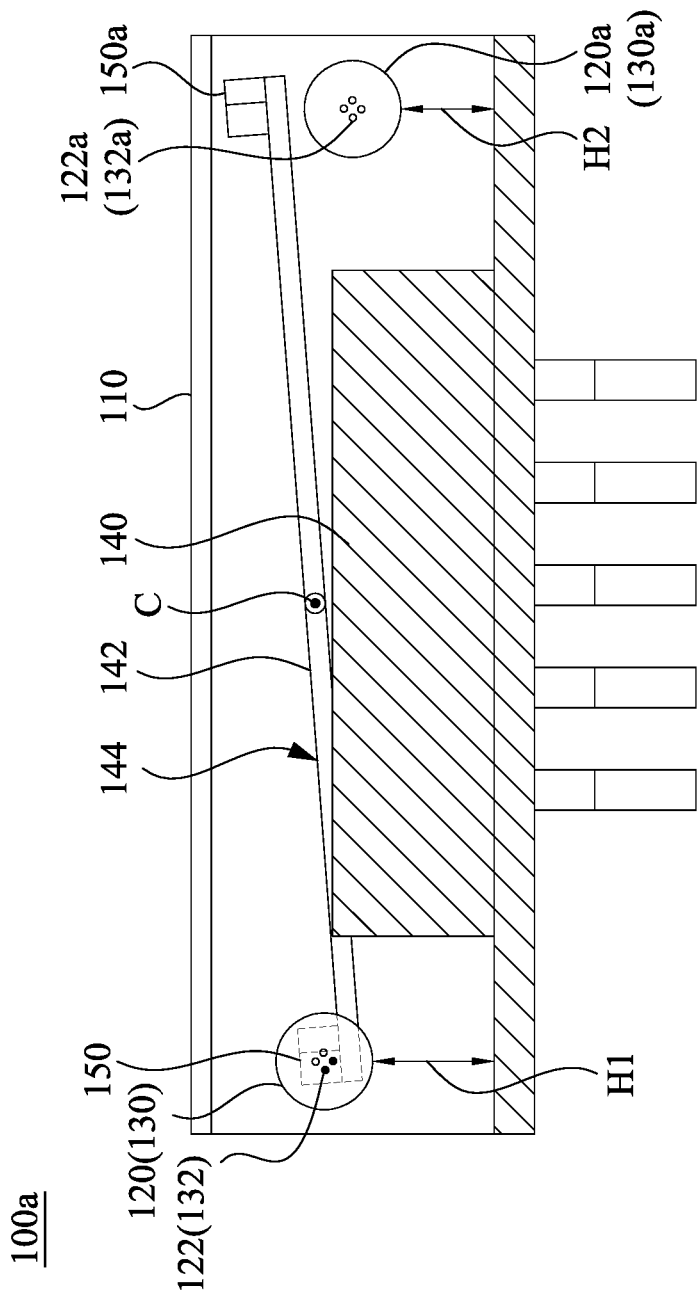
FIG. 10 is a schematic side view of the rotation support of the relay of FIG. 9 after rotating.

FIG. 10 is a schematic side view of the rotation support 142 of the relay 140 of FIG. 9 after rotating. The rotation support 142 rotates from the state of high left and low right in FIG. 9 to the state of low left and high right in FIG. 10. As a result, the prism 150 is lowered along with the left end of the rotation support 142, and the prism 150a is raised along with the right end of the rotation support 142. Regarding the state of the first collimator 120 and the opposite second collimator 130 in FIG. 10, the rotation support 142 is configured to enable the prism 150 to be in light transmission paths between a partial number of the first fibers 122 (e.g., the two first fibers 122 at the lower left side of FIG. 10) and a partial number of the opposite second fibers 132 (e.g., the two second fibers 132 at the lower left side of FIG. 10), such that the prism 150 refracts the optical signals of the partial number of the first fibers 122 to another partial number of the second fibers 132 to form a by-pass route. Regarding the state of the first collimator 120a and the opposite second collimator 130a in FIG. 10, the rotation support 142 is configured to enable the prism 150a to leave light transmission paths between the first fibers 122a and the opposite second fibers 132a, such that the optical signals of the first fibers 122a can pass directly to the opposite second fibers 132a.

Figure 11:
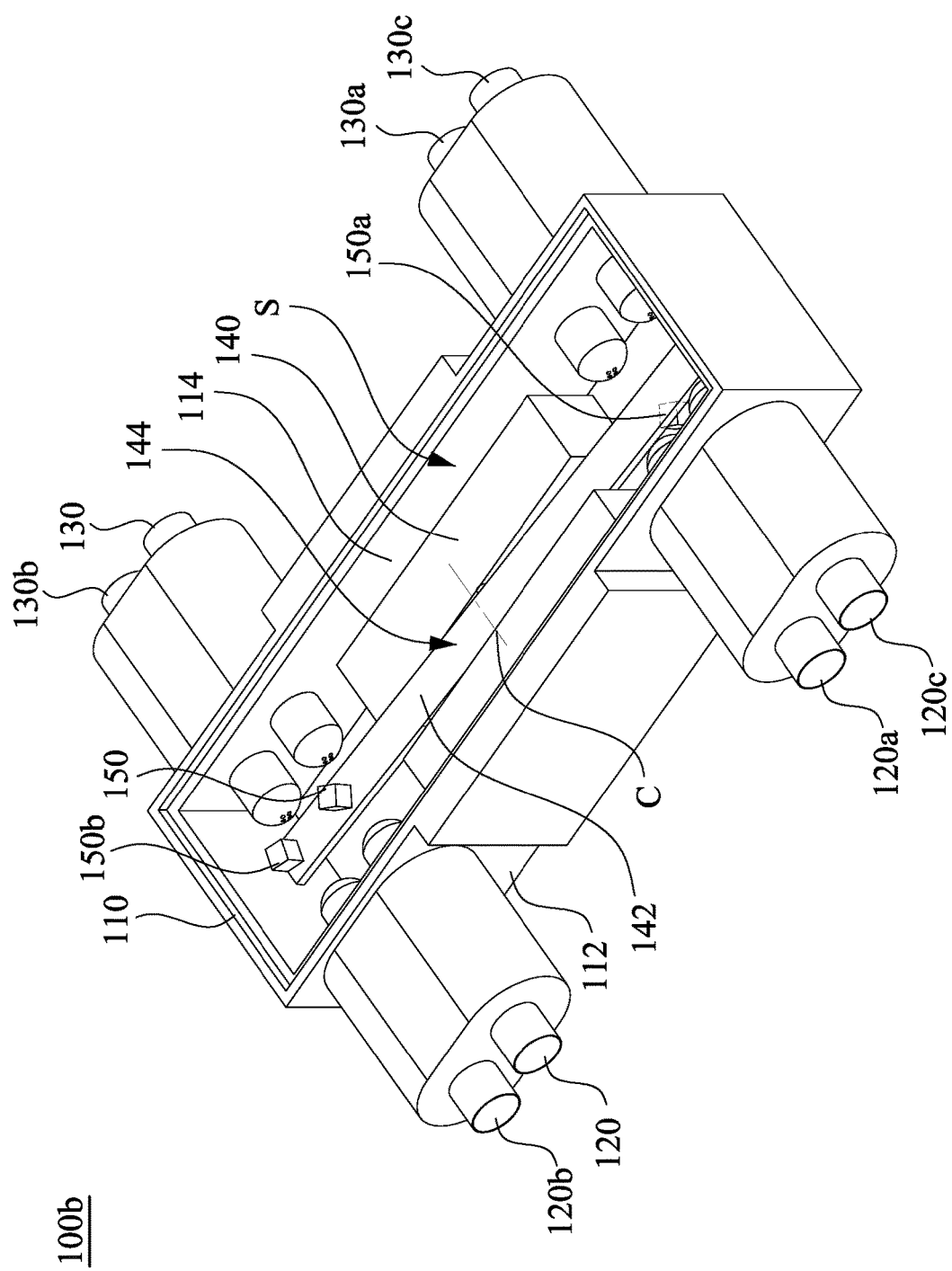
FIG. 11 is a perspective view of an optical switch module according to still another embodiment of the present disclosure.
Figure 12:
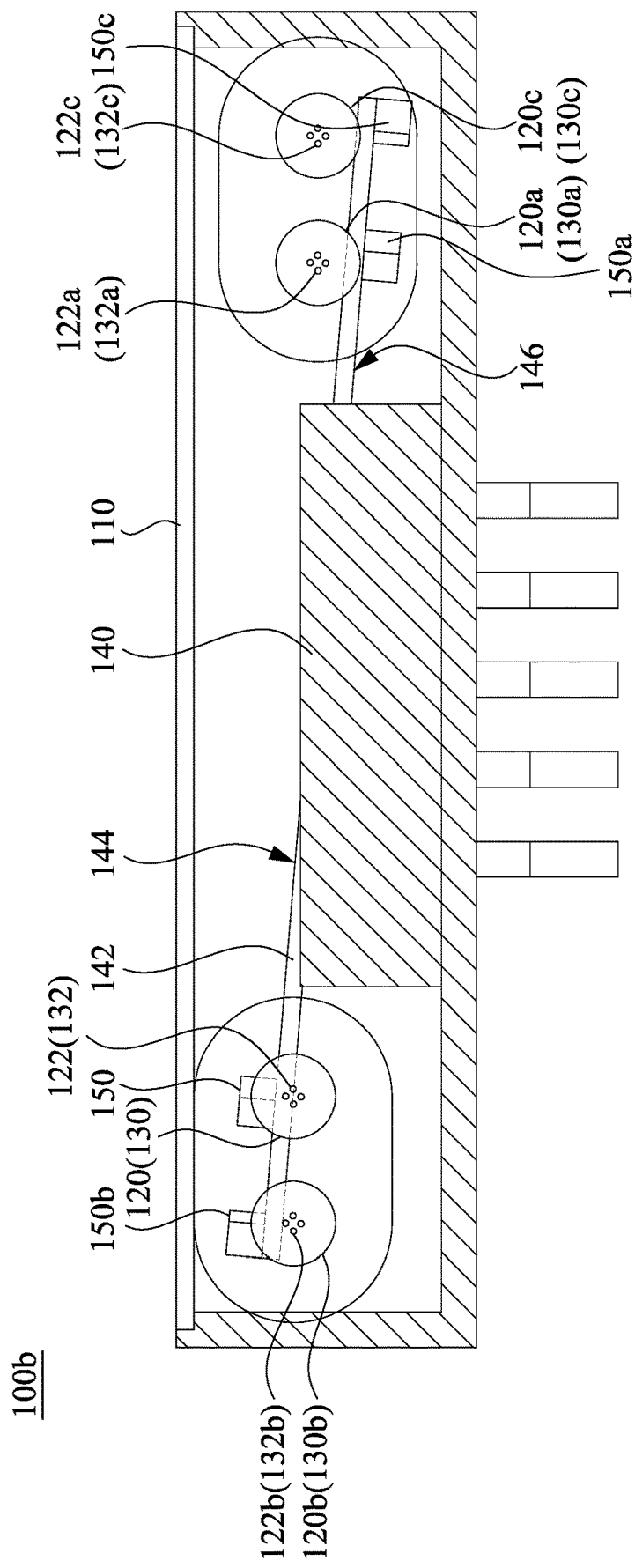
FIG. 12 is a schematic side view of the optical switch module of FIG. 11.

FIG. 11 is a perspective view of an optical switch module 100b according to another embodiment of the present disclosure. FIG. 12 is a schematic side view of the optical switch module 100b of FIG. 11. As shown in FIG. 11 and FIG. 12, the optical switch module 100b includes the housing 110, the first collimators 120, 120a, 120b and 120c, the second collimators 130, 130a, 130b and 130c, the relay 140, and the prisms 150, 150a, 150b and 150c. The difference between this embodiment and the embodiment of FIGS. 1 and 2 is that the first partial number of the prisms 150 and 150b are located on the top surface 144 of the rotation support 142, and the second partial number of the prisms 150a and 150c are located on a bottom surface 146 of the rotation support 142.

The rotation support 142 of FIGS. 11 and 12 is in a state of high left and low right. Regarding the state of the first collimator 120 and the opposite second collimator 130 in FIG. 12, the rotation support 142 is configured to enable the prism 150 to leave light transmission paths between the first fibers 122 and the opposite second fibers 132, such that the optical signals of the first fibers 122 can pass directly to the opposite second fibers 132. The operation mechanism of the first collimator 120b and the second collimator 130b are similar to that of the aforementioned first collimator 120 and the second collimator 130, and will not be described again.

Regarding the state of the first collimator 120a and the opposite second collimator 130a in FIG. 12, the rotation support 142 is configured to enable the prism 150a to leave light transmission paths between the first fibers 122a and the opposite second fibers 132a, such that the optical signals of the first fibers 122a can pass directly to the opposite second fibers 132a. The operation mechanism of the first collimator 120c and the second collimator 130c are similar to that of the aforementioned first collimator 120a and the second collimator 130a, and will not be described again.

Figure 13:
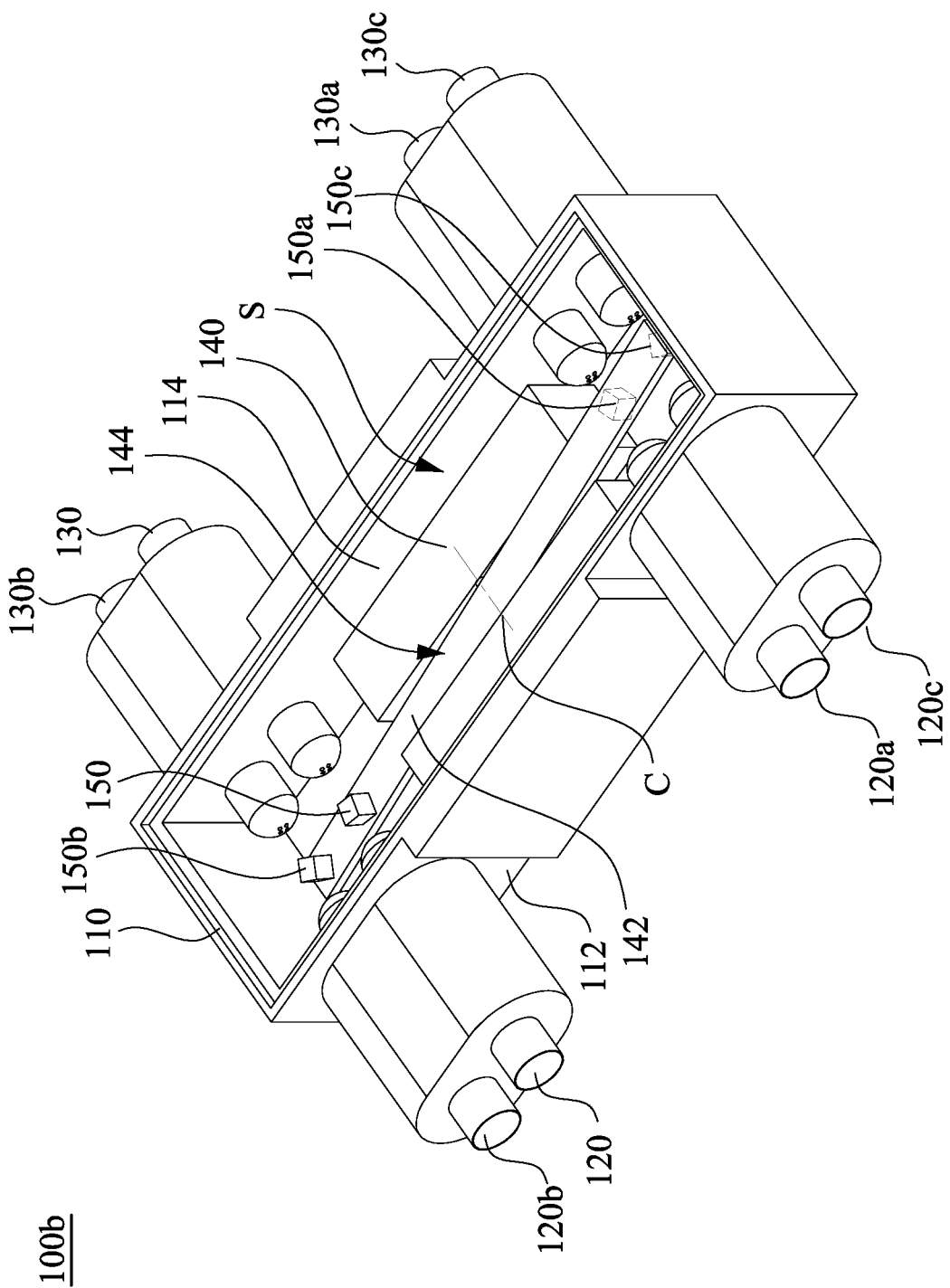
FIG. 13 is a perspective view of the rotation support of the relay of FIG. 11 after rotating.
Figure 14:
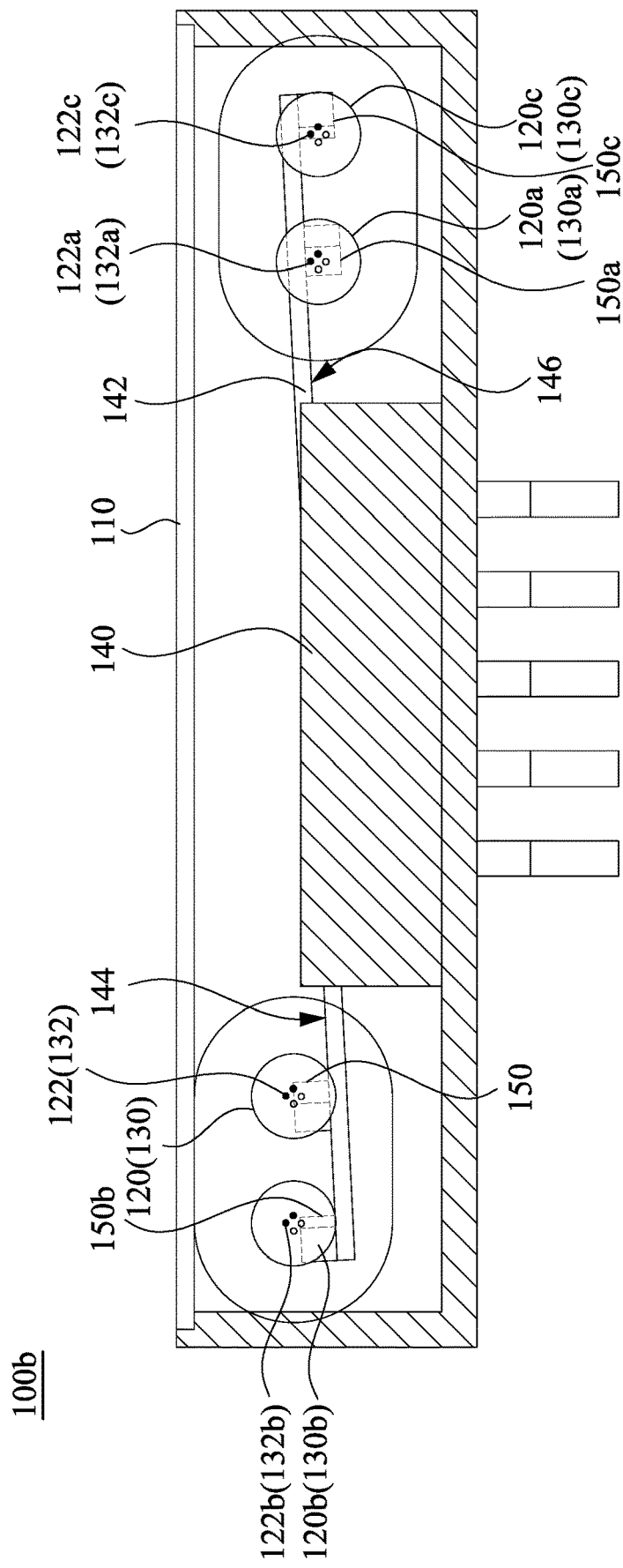
FIG. 14 is a schematic side view of the optical switch module of FIG. 13.

FIG. 13 is a perspective view of the rotation support 142 of the relay 140 of FIG. 11 after rotating. FIG. 14 is a schematic side view of the optical switch module 100b of FIG. 13. As shown in FIG. 13 and FIG. 14, the rotation support 142 rotates from the state of high left and low right in FIG. 11 to the state of low left and high right in FIG. 13. As a result, the prisms 150a and 150b are lowered along with the left end of the rotation support 142, and the prisms 150a and 150c are raised along with the right end of the rotation support 142.

Regarding the state of the first collimator 120 and the opposite second collimator 130 in FIG. 14, the rotation support 142 is configured to enable the prism 150 to be in light transmission paths between a partial number of the first fibers 122 (e.g., the two first fibers 122 at the upper right side of FIG. 14) and a partial number of the opposite second fibers 132 (e.g., the two second fibers 132 at the upper right side of FIG. 14), such that the prism 150 refracts the optical signals of the partial number of the first fibers 122 to another partial number of the second fibers 132 to form a by-pass route. The operation mechanism of the first collimator 120b and the second collimator 130b are similar to that of the aforementioned first collimator 120 and the second collimator 130, and will not be described again.

Regarding the state of the first collimator 120a and the opposite second collimator 130a in FIG. 14, the rotation support 142 is configured to enable the prism 150a to be in light transmission paths between a partial number of the first fibers 122a (e.g., the two first fibers 122a at the upper right side of FIG. 14) and a partial number of the opposite second fibers 132a (e.g., the two second fibers 132a at the upper right side of FIG. 14), such that the prism 150a refracts the optical signals of the partial number of the first fibers 122a to another partial number of the second fibers 132a to form a by-pass route. The operation mechanism of the first collimator 120c and the second collimator 130c are similar to that of the aforementioned first collimator 120a and the second collimator 130a, and will not be described again.

The aforementioned optical switch module 100 or 100b may be applied to an optical by-pass apparatus 200. In the following description, the optical switch module 100b is used as an example for explanation.

Figure 15:
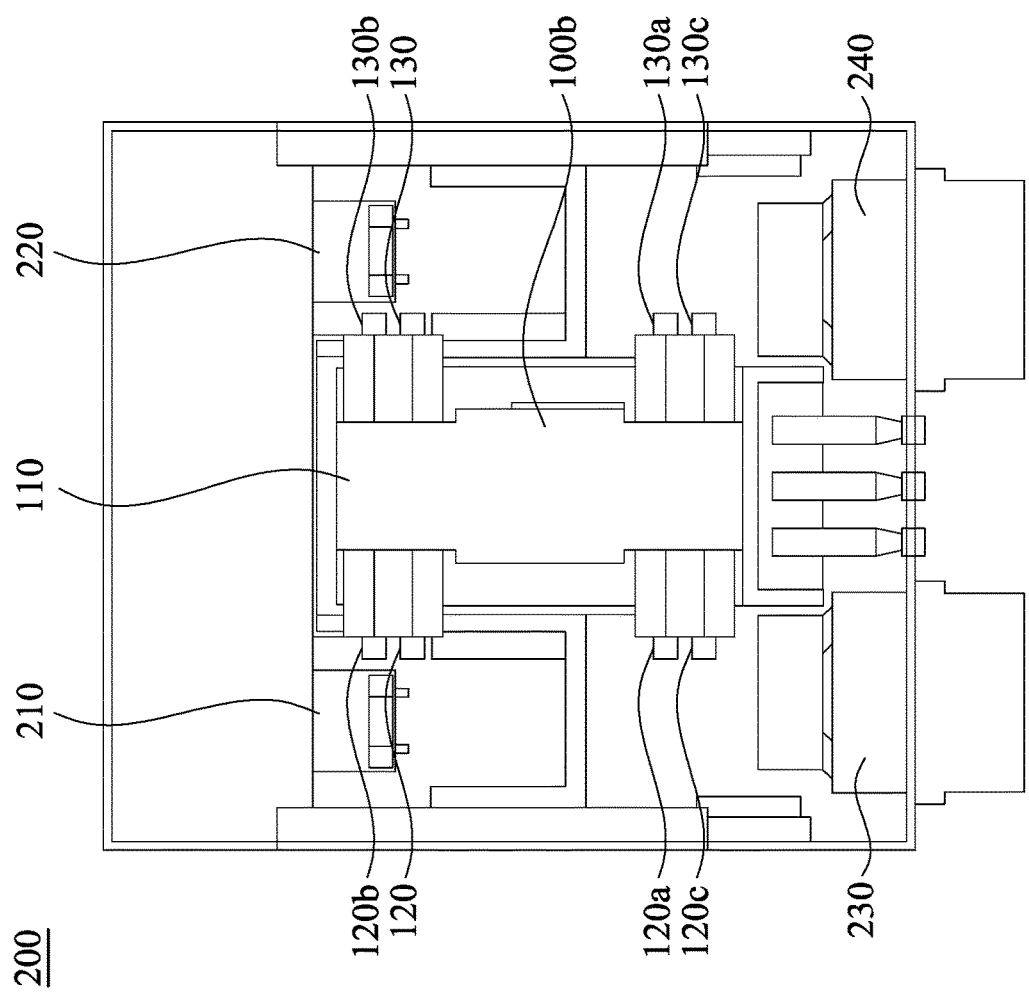
FIG. 15 is a top view of an optical by-pass apparatus according to one embodiment of the present disclosure.
Figure 16:
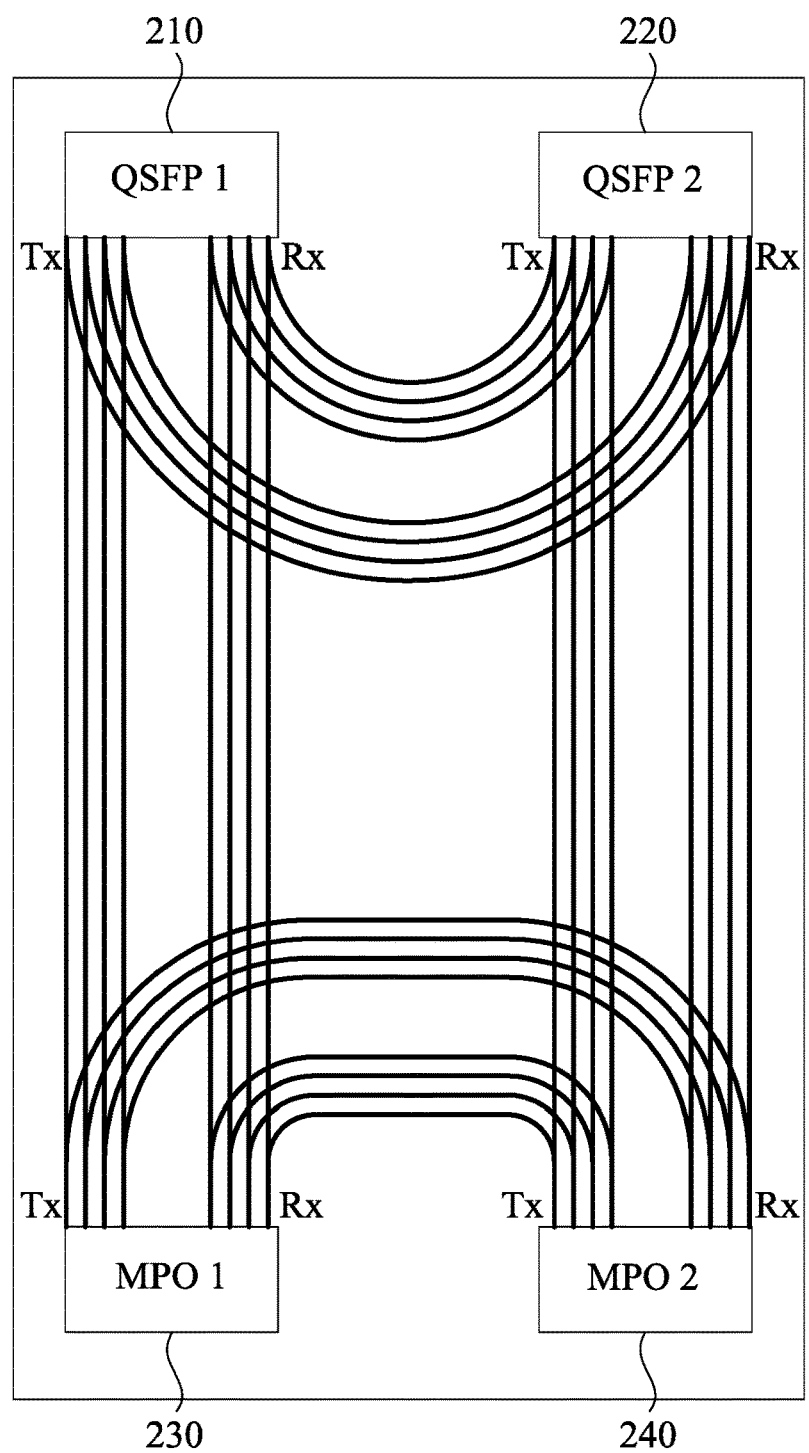
FIG. 16 is a schematic view of the fiber route of the optical by-pass apparatus of FIG. 15.

FIG. 15 is a top view of an optical by-pass apparatus 200 according to one embodiment of the present disclosure. FIG. 16 is a schematic view of the fiber route of the optical by-pass apparatus 200 of FIG. 15. As shown in FIG. 15 and FIG. 16, the optical by-pass apparatus 200 includes a first optical transceiver 210, a second optical transceiver 220, a first multi-fiber connector 230, a second multi-fiber connector 240, and the aforementioned optical switch module 100b. In this embodiment, for example, the first optical transceiver 210 and the second optical transceiver 220 may be quad small form-factor pluggable (QSFP) modules, and the first multi-fiber connector 230 and the second multi-fiber connector 240 may be multi-fiber push on (MPO) modules.

When the fiber route is in normal mode, the first multi-fiber connector 230 may be optically connected to the first optical transceiver 210 by using physical optical fiber cables, and the second multi-fiber connector 240 may be optically connected to the second optical transceiver 220, such that optical signals are transmitted through the optical fiber cables outside the optical switch module 100b.

In this embodiment, the first optical transceiver 210 connects the first fibers 122 and 122b (see FIG. 12) of a first partial number of the first collimators 120 and 120b, the first multi-fiber connector 230 connects the first fibers 122a and 122c (see FIG. 12) of a second partial number of the first collimators 120a and 120c, the second optical transceiver 220 connects the second fibers 132 and 132b (see FIG. 12) of a first partial number of the second collimators 130 and 130b, and the second multi-fiber connector 240 connects the second fibers 132a and 132c (see FIG. 12) of a second partial number of the second collimators 130a and 130c.

When the fiber route is abnormal, the fiber route is changed to be in by-pass mode. Since the optical by-pass apparatus 200 has the optical switch module 100b, the first optical transceiver 210 can be optically connected the second optical transceiver 220 through the first fibers 122 and 122b (see FIG. 14) of the first partial number of the first collimators 120 and 120b and the second fibers 132 and 132b (see FIG. 14) of the first partial number of the second collimators 130 and 130b. For example, in FIG. 16, the transmit port TX of the first optical transceiver 210 may be optically connected to the receive port RX of the second optical transceiver 220, and the receive port RX of the first optical transceiver 210 may be optically connected to the transmit port TX of the second optical transceiver 220, thereby performing signal self-test. Furthermore, the first multi-fiber connector 230 may be optically connected to the second multi-fiber connector 240 through the first fibers 122a and 122c (see FIG. 14) of the second partial number of the first collimators 120a and 120c and the second fibers 132a and 132c (see FIG. 14) of the second partial number of the second collimators 130a and 130c. For example, in FIG. 16, the transmit port TX of the first multi-fiber connector 230 may be optically connected to the receive port RX of the second multi-fiber connector 240, and the receive port RX of the first multi-fiber connector 230 may be optically connected to the transmit port TX of the second multi-fiber connector 240, thereby connecting signals to the next system to prevent the optical by-pass apparatus 200 from partial failure to affect the entire system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. An optical switch module, comprising:
a housing having an accommodating space, a first sidewall, and a second sidewall that is opposite to the first sidewall, wherein the accommodating space is located between the first sidewall and the second sidewall;
at least two first collimators located on the first sidewall, wherein each of the first collimators is configured to connect even number of first fibers;
at least two second collimators located on the second sidewall, wherein each of the second collimators is configured to connect even number of second fibers, and the second collimators are respectively aligned with the first collimators;
a relay located in the accommodating space and having a rotation support, wherein each of two ends of the rotation support extends to a position between the aligned first and second collimators; and
a plurality of prisms located on the rotation support and respectively between the first and second collimators, wherein the rotation support is configured to enable at least one of the prisms to be in light transmission paths between a partial number of the first fibers and a partial number of the second fibers to refract optical signals of the partial number of the first fibers to another partial number of the second fibers.

2. The optical switch module of claim 1, wherein a first partial number of the prisms and a second partial number of the prisms are respectively located at two sides of a center line of the rotation support.

3. The optical switch module of claim 2, wherein the first partial number of the prisms and the second partial number of the prisms are located on a top surface of the rotation support.

4. The optical switch module of claim 2, wherein the first partial number of the prisms are located on a top surface of the rotation support, and the second partial number of the prisms are located on a bottom surface of the rotation support.

5. The optical switch module of claim 1, wherein the number of the first collimators and the number of the second collimators are both two, the two first collimators are respectively located at two sides of a center line of the rotation support, and the two second collimators are respectively located at the two sides of the center line of the rotation support.

6. The optical switch module of claim 5, wherein there is a height different between the two first collimators in a vertical direction, and there is a height different between the two second collimators in the vertical direction.

7. The optical switch module of claim 1, wherein the number of the first collimators and the number of the second collimators are both four, two of the four first collimators and two of the four second collimators are located at a side of a center line of the rotation support, and another two of the four first collimators and another two of the four second collimators are located at another side of the center line of the rotation support.

8. The optical switch module of claim 7, wherein the two first collimators and the two second collimators located at the side of the center line of the rotation support have the same height in a vertical direction so as to have a first height, but the another two first collimators and the another two second collimators located at the another side of the center line of the rotation support have the same height in the vertical direction so as to have a second height, and the second height is less than the first height.

9. The optical switch module of claim 1, wherein a fulcrum of the rotation support is located on a center line of the rotation support to define a seesaw structure.

10. The optical switch module of claim 1, wherein the prisms are arranged along a lengthwise direction of the rotation support.

11. An optical switch module, comprising:
a housing having an accommodating space, a first sidewall, and a second sidewall, wherein the accommodating space is located between the first sidewall and the second sidewall;
at least two first collimators located on the first sidewall, wherein each of the first collimators is configured to connect even number of first fibers;
at least two second collimators located on the second sidewall, wherein each of the second collimators is configured to connect even number of second fibers, and the second collimators are respectively aligned with the first collimators;
a relay located in the accommodating space and having a rotation support, wherein a fulcrum of the rotation support is located on a center line of the rotation support to define a seesaw structure; and
a plurality of prisms located on the rotation support, wherein a first partial number of the prisms and a second partial number of the prisms are respectively located at two sides of the center line of the rotation support, and the rotation support is configured to enable at least one of the prisms to be in light transmission paths between a partial number of the first fibers and a partial number of the second fibers to refract optical signals of the partial number of the first fibers to another partial number of the second fibers.

12. The optical switch module of claim 11, wherein the first partial number of the prisms and the second partial number of the prisms are located on a top surface of the rotation support.

13. The optical switch module of claim 11, wherein the first partial number of the prisms are located on a top surface of the rotation support, and the second partial number of the prisms are located on a bottom surface of the rotation support.

14. The optical switch module of claim 11, wherein the number of the first collimators and the number of the second collimators are both two, the two first collimators are respectively located at the two sides of the center line of the rotation support, and the two second collimators are respectively located at the two sides of the center line of the rotation support.

15. The optical switch module of claim 14, wherein there is a height different between the two first collimators in a vertical direction, and there is a height different between the two second collimators in the vertical direction.

16. The optical switch module of claim 11, wherein the number of the first collimators and the number of the second collimators are both four, two of the four first collimators and two of the four second collimators are located at a side of the center line of the rotation support, and another two of the four first collimators and another two of the four second collimators are located at another side of the center line of the rotation support.

17. The optical switch module of claim 16, wherein the two first collimators and the two second collimators located at the side of the center line of the rotation support have the same height in a vertical direction so as to have a first height, but the another two first collimators and the another two second collimators located at the another side of the center line of the rotation support have the same height in the vertical direction so as to have a second height, and the second height is less than the first height.

18. The optical switch module of claim 11, wherein the prisms are arranged along a lengthwise direction of the rotation support.

19. An optical by-pass apparatus, comprising:
a first optical transceiver;
a second optical transceiver;
a first multi-fiber connector optically connected to the first optical transceiver;

a second multi-fiber connector optically connected to the second optical transceiver; and an optical switch module comprising:
- a housing having an accommodating space, a first sidewall, and a second sidewall that is opposite to the first sidewall, wherein the accommodating space is located between the first sidewall and the second sidewall;
- at least two first collimators located on the first sidewall, wherein each of the first collimators is configured to connect even number of first fibers;

at least two second collimators located on the second sidewall, wherein each of the second collimators is configured to connect even number of second fibers, and the second collimators are respectively aligned with the first collimators;
- wherein the first optical transceiver connects the first fibers of a first partial number of the first collimators, and the first multi-fiber connector connects the first fibers of a second partial number of the first collimators; the second optical transceiver connects the second fibers of a first partial number of the second collimators, and the second multi-fiber connector connects the second fibers of a second partial number of the second collimators;
- a relay located in the accommodating space and having a rotation support, wherein each of two ends of the rotation support extends to a position between the aligned first and second collimators; and
- a plurality of prisms located on the rotation support and respectively between the first and second collimators, wherein the rotation support is configured to enable at least one of the prisms to be in light transmission paths between a partial number of the first fibers and a partial number of the second fibers to refract optical signals of the partial number of the first fibers to another partial number of the second fibers.

20. The optical by-pass apparatus of claim 19, wherein the first optical transceiver is optically connected to the second optical transceiver through the first fibers of the first partial number of the first collimators and the second fibers of the first partial number of the second collimators; and the first multi-fiber connector is optically connected to the second multi-fiber connector through the first fibers of the second partial number of the first collimators and the second fibers of the second partial number of the second collimators.

* * * * *